United States Patent [19]
James et al.

[11] 3,880,742
[45] Apr. 29, 1975

[54] β-1,4,/β1,3 GLUCANASE
[75] Inventors: Arthur Edwin James; Godfrey Fare, both of Ulverston; Brian Frederick Sagar, Cheadle; Fred Lucas, Manchester; Mitchell Ian DeGray, Oakley, all of England
[73] Assignee: Glaxo Laboratories Limited, Middlesex, England
[22] Filed: Feb. 20, 1973
[21] Appl. No.: 333,527

[30] Foreign Application Priority Data
Feb. 22, 1972 United Kingdom................ 8215/72

[52] U.S. Cl................... 195/31 R; 195/62; 195/65; 195/66 R; 426/53
[51] Int. Cl............................................ C12d 13/10
[58] Field of Search...................... 195/65, 66 R, 62

[56] References Cited
OTHER PUBLICATIONS
Chesters et al., Biochemical Journal, Vol. 86, pp. 38 to 46, (1963).

Primary Examiner—Lionel M. Shapiro
Attorney, Agent, or Firm—Bacon & Thomas

[57] ABSTRACT

A thermostable β-1,4/β-1,3 glucanase-containing enzyme composition, characterised by retention of at least 75 percent of β-glucanase activity on heating in aqueous solution at pH 6.0 at 95°C for 10 minutes, is prepared by culturing an organism of the species *Penicillium emersonii* in the presence of at least one β-linked carbohydrate substrate. The use of the enzyme composition in the biodegradation of β-1,4/β-1,3 glucan substrates such as barley-containing animal feed components and barley mashes is also described.

13 Claims, No Drawings

β-1,4,/β1,3 GLUCANASE

This invention relates to enzymes useful in the biodegradation of barley β-glucans and related β-1,4/β-1,3 glucans.

It is known that β-glucan derived from barley consists of a linear structure of β-1,4- and β-1,3- glucopyranose residues, typically in proportions of about 2.5:1 to 3.0:1. The β-glucan is extremely fibrous in the dry state and yields highly viscous solutions. This viscous nature of the β-glucan gives rise to problems in a number of the conventional applications of barley.

Thus, for example, barley is commonly used as an animal feed, particularly for chickens. The digestive system of the chicken is not capable of appreciably degrading β-glucan, however, and so the β-glucan passes through the digestive system unchanged, resulting in the production of sticky droppings by the bird. In addition to the nutrient loss resulting from this excretion of non-degraded β-glucan, the viscous β-glucan tends to coat the metabolisable constituents of the barley, further decreasing the nutrient value of the feed.

Analogous problems arise in brewing processes where raw barley is used to replace malted barley in mashing. Thus, whereas malted barley has a β-glucanase content which will induce degradation of barley β-glucan during mashing, this β-glucanase content is generally insufficient when un-malted barley is added to the mash. The resulting β-glucan content of the mash can give rise to difficulties in filtration to produce wort and may necessitate special conditions of milling, lautering etc. to obivate obviate Attempts to overcome these disadvantages have been made by incorporating enzymes with β-glucanase activity into, for example, chicken feed and barley mashes. However, such enzyme supplementation may be inactivated by heat treatment of the barley product, since known β-glucanases tend to undergo denaturation at temperatures much in excess of 60°C. Such heat treatments include the production of feed pellets for chickens, wherein live steam is administered to the barley feed mix to produce a general temperature of 60°–70°C (and necessarily considerably higher local temperatures) and enhance the moisture content thereof in order to obtain a pelletable mix, and the mashing stage of barley brewing processes, wherein the extraction may be effected at temperatures up to 85°C, typically 55°–63°C. There is thus considerable utility for a thermostable β-glucanase enzyme capable of resisting the high temperatures encounted in such processes.

A further prime consideration in the incorporation of β-glucanase enzymes into barley is the cost of preparation of such enzymes. Thus barley is used, for example, to replace wheat as chicken food principally on account of its lower cost, and it is desirable to retain such a cost advantage in enzyme-treated barley.

We have therefore investigated the production of β-glucanases by a wide range of microorganisms with particular regard to the thermal stability of the enzyme and to the yield thereof, and have found that a β-glucanase exhibiting the desired properties can be obtained in good yield from organisms of the species *Penicillium emersonii*, whereas other microorganisms produced considerably less satisfactory enzymes in lower yields.

Thus according to one aspect of the present invention we provide a thermostable β-1,4/β-1,3 glucanase derived from *P. emersonii*. This thermostable enzyme is characterised by retention of at least 75 percent of β-glucanase activity on heating in aqueous solution at pH 6.0 at 95°C for 10 minutes. A particularly preferred β-glucanase is that derived from *P. emersonii* of strain I.M.I. 116815 and mutants thereof.

With regard to the measurement of enzymatic thermostabilities there is no internationally recognised unit for β-glucanase activity. For convenience in activity measurements, therefore, one standard enzyme preparation has been assigned an arbitrary potency of 100 units per milligram and other enzyme solutions or preparations are compared with this standard on a viscometric basis. An 0.5 percent solution of barley β-glucan is used, buffered in the test with pH 4.5 acetate buffer and the rate of decrease of specific viscosity due to β-glucanase enzyme attack at 40°C is measured, usually after 10 minutes incubation. The relative degradations by the test enzyme and the arbitrary standard (using 0.25 units per 3.75 ml. of 0.5 percent glucan) are then compared. Under such conditions the decrease of specific viscosity is very nearly linearly related to enzyme activity.

In stability measurements made using this assay technique, an enzyme derived from *P. emersonii* mixed with chicken feed ingredients to simulate a pelleting mix with 18 percent moisture content retained 90 – 96 percent of its activity after 10 minutes at 90°C in a closed vessel. Even at 100°C under these conditions there is 70 percent retention. Enzymes from other organisms were appreciably less thermostable.

After heating in solution at pH 6.0 for 10 minutes at 95°C the *P. emersonii* enzyme retained 79 percent of its activity, whereas, again, enzymes from other microorganisms were markedly less stable.

The thermal stability of the β-glucanase may be enhanced further by precipitating the enzyme bound to a suitable β-linked carbohydrate, so that the enzyme is stabilised by substrate-enzyme binding. Suitable carriers include ground barley (by virtue of its β-glucan content); acid hydrolysed cellulose such as Masonex; pectin; sodium alginate; methyl cellulose and sodium carboxymethyl cellulose, this last being particularly preferred. The use of such carriers is advantageous in applications of dried enzyme preparations to chicken feed, since the carrier particles tend to "shield" the enzyme from the heat generated by live steam during subsequent pelleting.

The β-glucanase of the invention may be prepared by fermenting an inoculum of *P. emersonii* in a nutrient medium therefor so that β-glucanase is produced. The nutrient medium should be such as to promote adequate growth of the organism while maintaining it in the correct state for enzyme production. Nutrients containing β-linked carbohydrates, for example cellulose, barley β-glucan and β-mannans (conveniently obtained from yeast cells in distillers solubles), are included in the medium, preferably as the predominant carbohydrate source, to promote β-glucanase formation. The carbohydrate in the medium advantageously includes at least 60 percent by weight of β-linked carbohydrates. Barley may be used as the source of such β-glucan, although the α-linked starch content of barley will first promote formation of α-amylases, the formation of β-glucanase tending to be retarded until this starch content has been used up. Cellulose, for example Solka floc or cotton linters, is comparatively slowly assimilated and tends to maintain the fermentation in a healthy state oriented towards using β-linked substrates. As indicated above, distillers solubles may advantageously be used as a source of β-mannans, and further provide B group vitamins, calcium and phosphate. The distillers solubles and barley will further act as nitrogen sources, although it may be desirable to incorporate further sources such as ammonium salts, nitrate ion or soya meal. Magnesium should normally be present and other metals, such as iron, zinc, manganese, copper, cobalt and molybdenum, and non-metals such as boron and iodine may, if desired, be added as trace elements, and vitamins such as meso-inositol, p-aminobenzoic acid, thiamine, nicotinic acid, riboflavin, calcium pantothenate, pyridoxin and biotin may be included. A satisfactory fermentation can, however, be effected without the use of such trace elements and vitamins since they will normally be present as impurities in other components.

Advantageously the medium contains barley in concentrations in the range 0.2 to 2.0 percent w/v, cellulose in concentrations in the range 0.2 to 2.0 percent (or even up to 3.0 percent) w/v and 0.4 to 2.0 percent (or even up to 3.0 percent) w/v of distillers solubles.

P. emersonii is a thermophilic organism and does not grow significantly at temperatures below about 37°–40°C, its maximum growth temperature being a little over 55°C. The most satisfactory fermentation performance in terms of yield of β-glucanase occurs at temperatures in the range of about 50°–54°C. The optimum pH for the fermentation is between 3.5 and 4.5, and the fermentation is normally maintained for 7–10 days.

The medium is advantageously stirred during fermentation. Powerful agitation is desirable at the begining of the fermentation in cases where Solka floc is used, since this produces a very thick suspension which does, however, thin out as the fermentation proceeds.

It is further desirable to employ conditions of aeration of the order of 10–50 cfm per 1,000 gallons during fermentation.

The β-glucanase is exocellular, and may be extracted from the fermentation product by, for example, conventional methods. The first stage is normally to filter off the mycelium formed, preferably by means of precoat filtration. If a solid enzyme product is required, the enzymes and extraneous protein may be precipitated from the filtrate by the addition of an excess of a water-miscible organic solvent, e.g. an alcohol such as ethanol or a ketone such as acetone. Either direct precipitation or precipitation onto a carrier may be used, typical carriers including starch and the carriers described above as confering added thermal stability on the enzyme, particularly sodium carboxymethyl cellulose.

An alternative mode of treatment is to filter off the mycelium, concentrate the resulting filtrate, preferably in vacuo, absorb the concentrated solution in a suitable absorbent solid, for example ground wheat or barley, and dry the resulting damp mass, preferably to a moisture content of 10 percent or less. A carrier such as sodium carboxylmethyl cellulose may again be incorporated into the composition. This form of processing gives an active enzyme product, suitable for use in, for example, animal feeds, without recourse to expensive solvent precipitations. The enzyme-containing liquid concentrate may itself be employed as the β-glucanase source in subsequent use of the enzyme; materials such as sodium chloride that confer enzyme storage stability, enzyme thermostability and/or bacteriological stability may if desired be added to such liquid concentrates. Alternatively the liquid concentrate may be dried, e.g. by spray drying, freeze drying or roller drying to yield a dry enzyme composition.

It should be noted that the enzyme preparations obtained from the fermentation will normally contain other β-glucanses in addition to barley β-glucanase. Typically some laminarinase, hydroxyethyl cellulase and cellulase activities may be observed, and α-amylase is normally present from the starch attacking phase of the fermentations. The other enzymes in this complex are, in fact, often advantageous and may assist the β-glucanase to deal more completely with the β-glucan residues. In brewing, of course, α-amylase will be required for starch degradation although this may be supplied in the form of conventional malt or bacterial α-amylase. It will be appreciated that the invention extends to mixtures of the barley β-glucanase with other enzymes and particularly the exocellular enzymes from P. emersonii with which it is produced.

The inoculum of P. emersonii used in the fermentation may be obtained by, for example, scaling up from a surface culture of the organism. The nutrient media used in such scaling up preferably contain similar components to those described for the main fermentation medium except that cellulose is not normally included in the solid medium. The composition of a suitable solid medium for initial surface culture of P. emersonii is shown in Table 1.

Table 1

| | % w/v |
|---|---|
| Ground barley | 1.50 |
| Distillers solubles | 0.50 |
| Ammonium dihydrogen phosphate | 0.40 |
| Diammonium hydrogen phosphate | 0.20 |
| Ammonium nitrate | 0.025 |
| Magnesium sulphate heptahydrate | 0.05 |
| Potassium chloride | 0.05 |
| Sodium sulphate decahydrate | 0.10 |
| Calcium chloride hydrated | 0.05 |
| Agar | 1.50 |

If desired, trace elements and/or vitamins can be incorporated in the solid medium. These are, however, generally naturally present in sufficient quantity.

In a typical inoculum preparation the medium is sterilised, e.g. by autoclaving at about 120°C for 15 minutes, and after cooling is inoculated with P. emersonii. Incubation is preferably carried out at about 45°–55°C for about 4 days, by which time growth should cover the surface and sporulation should have occurred. The resulting cultures may be stored at 4°C for at least three weeks.

Scaling up to productive fermentation may conveniently be effected by carrying out a laboratory stage (a) of vegetative growth followed by one or more seed stages (b) in stirred fermentation vessels. Suitable media compositions for these stages (a) and (b) are shown in Tables 2 and 3 respectively.

Table 2

| | % w/v |
|---|---|
| Ground barley | 0.25 |
| Cellulose (Solka-Floc) | 0.75 |
| Distillers solubles | 0.75 |
| Diammonium hydrogen phosphate | 0.15 |
| Ammonium dihydrogen phosphate | 0.35 |
| Potassium nitrate | 0.05 |

Table 2-Continued

| | % w/v |
|---|---|
| Sodium sulphate decahydrate | 0.10 |
| Magnesium sulphate heptahydrate | 0.05 |
| Calcium chloride hydrated | 0.05 |
| Ferrous ammonium sulphate hydrated | 0.00125 |
| Zinc sulphate hydrated | 0.00025 |
| Manganese sulphate hydrated | 0.00025 |
| Copper sulphate hydrated | 0.00025 |
| Cobalt nitrate | 0.00025 |
| Potassium iodide | 0.00025 |
| Boric acid | 0.00025 |
| Sodium molybdate hydrated | 0.00025 |

Table 3

| | % w/v |
|---|---|
| Ground barley | 0.25 |
| Solka floc | 1.25 |
| Distillers solubles | 1.00 |
| Diammonium hydrogen phosphate | 0.0625 |
| Potassium dihydrogen phosphate | 0.35 |
| Ammonium sulphate | 0.4 |
| Potassium nitrate | 0.05 |
| Remaining salts as in Table 2 | |

In the laboratory stage, mycelium and spores from the solid agar medium may be incubated in, for example, about 500 ml. of the liquid medium shown in Table 2, which should normally have a pH of about 3.5–5.0, for about 48, or even 72, hours at 45°–55°C, on a shaker. The medium is preferably sterilised before incubation, e.g. by autoclaving at about 120°C for 15 minutes. Good mycelial growth should be present at this stage.

The culture so obtained may then be used to inoculate the seed stage; a 1 gallon seed stage vessel containing the medium described in Table 3 can conveniently be inoculated with such a laboratory stage culture. The medium for this stage is preferably prepared by sterilising all the ingredients together in the seed stage vessel for 90 minutes at 121°C. Using 1 gallon of medium in the seed stage, culturing is preferably effected at about 50°C for about 48, or even 72 hours, with stirring, e.g. at 800 r.p.m, and aeration, e.g. with 2 litres/minute of air. At the end of this culture stage vigorous mycelial growth is evident and the cellulose fibres microscopically show evidence of enzymatic attack.

The seed stage culture thus obtained may then be used to inoculate a producing stage, e.g. of 10 gallon capacity stirred at 400 r.p.m, which may be fermented as hereinbefore described.

Alternatively, further seed stages, identical in nature, may be grown in successively larger vessels to scale up the seed for use in larger production vessels of, for example, 25,000 gal. capacity.

Simpler media are equally acceptable for the seed stages; for example, barley syrup (5 percent w/v) and Yeatex granules (a yeast extract sold by English Grains Co. Ltd.) (2% w/v), sterilised together, support a heavy vegetative growth in 48 hours under the conditions previously described.

In the foregoing fermentations, the vessels used should be resistant to the media; glass-lined or stainless steel vessels are preferred for this purpose.

The thermostable barley $\beta$-glucanase of the invention may be incorporated into animal feed, particularly barley-based chicken feed, to increase the nutritional value of the feed by promoting degradation of the $\beta$-glucan content of barley. The thermal stability of the enzyme ensures that there is no significant loss of activity during its passage through the digestive system of the animal, the body temperature of a chicken, for example, being about 40°C. The enzyme is stable to low pH and can thus withstand the pH of 2–3 in the crop of a chicken where it is resident for some minutes. A liquid concentrate containing the enzyme may be applied, preferably in prescribed dosage units, to formed animal feed pellets. Alternatively a solid extract or absorbate of the enzyme, otpionally together with a $\beta$-linked carbohydrate carrier e.g. sodium carboxymethyl cellulose may be incorporated into the feed mix before pelleting, preferably so that each pellet contains a prescribed dose of enzyme, preferably 10 to 40 $\times$ 10$^6$ units per ton of barley. As a result of the thermal stability of the enzyme, enzyme-treated feed mixes can be pelleted using live steam with substantial retention of enzymatic activity.

Barley $\beta$-glucanase may also advantageously be employed in the mashing stage of barley brewing, in order to reduce the viscosity of the wort arising from its $\beta$-glucan content. This treatment allows faster filtration of the wort, while the degradation products of the $\beta$-glucan further enhances its sugar content. This can also be of advantage in production of malt syrups for other purposes e.g. in confectionery.

A typical conventional enzymatic brewing process comprises the steps of steeping and milling barley, normally together with some malt, mashing the milleddproduct after milled product of suitable enzymes and finally filtering off the wort from the mash. The enzymes most commonly used include cellulase, hemicellulase and $\alpha$-amylase. Protease is normally also added to promote degradation of proteins into amino acids, and pectinase may if desired be incorporated.

The mash is first heated to, for example, about 50°–60°C to promote degradation and solubilisation of cellulose, hemicellulose, proteins and possibly pectin. Further heating, for example to about 85°–90°C, is then employed to liquefy the starch and enhance its degradation by $\alpha$-amylase. The mash is subsequently cooled and filtrered, if desired the sugar content being adjusted, for example by treatment with a saccharifying enzyme at 55°–65°C. Before final filtration the mash is usually heated to 85°–115°C to inactivate the various enzymes and it is particularly useful that in heating the mesh to this temperature the thermostable $\beta$-glucanase passes into a phase of extremely high activity prior to inactivation. By acting very rapidly at these high temperatures the $\beta$-glucanase degrades the $\beta$-glucan without unduly increasing the mashing period.

The $\beta$-glucan content of barley is largely distributed among the starch granules, so that any $\beta$-glucanase added to the mash should preferably be active in the high temperature stage of $\alpha$-amylase activity following starch liquefaction if optimum $\beta$-glucan degradation is to be effected. Whereas known $\beta$-glucanases will be substantially inactivated at the temperatures encountered in this stage, the thermostable $\beta$-glucanase of the invention retains considerable activity under these conditions and so its use in such mashing processes is highly advantageous.

As indicated above, the $\beta$-glucanase enzyme preparations obtained in accordance with the invention will normally exhibit further forms of enzymatic activity, including cellulase and $\alpha$-amylase activity, so that the use of the enzyme preparation in such enzymatic brewing processes has the additional advantage of reducing the quantities of such enzymes to be added separately to the mash.

In general the addition of the β-glucanase of the invention to mashes in barley brewing will improve the filtration rate of the mash by degradation of the viscous β-glucan.

The following non-limitative Examples serve to illustrate the invention.

EXAMPLE 1

P. emersonii (I.M.I. 116815) was ground on an agar medium having the composition shown in Table 1 and further containing trace elements and vitamins, for 4 to 7 days at 50°C until well sporulated. The spores were then used to inoculate a liquid culture stage in the medium given in Table 2 which was incubated at 50°C for 48 hours on a rotary shaker at 120 rpm with 2 inches throw. 100 ml. of the vegetative mycelium was used to inoculate a 5 litre stirred seed stage containing 4 litres of the medium given in Table 3. The vessel was stirred at 800 rpm with two 3½ inch × ½ inch impellors and aerated at 1 litre per minute for 48 hours at 50°C.

This culture of vegetative mycelium was used to inoculate a 50 litre fermenter containing 40 litres of medium of the same composition as the seed stage except that the concentrations of barley, solkafloc and distillers solubles were changed to 0.4, 1.4 and 1.4 percent respectively. The fermenter was stirred at 400 rpm with one 5 inches by 1¼ inch six bladed impellor and aerated with 12 litres per minute of air at 50°C. Evaporation was severe under these conditions and the fermenter volume was maintained by the routine addition of sterile water. After 214 hours incubation, the broth filtrate contained 1,500 units/ml.

The broth was filtered easily on a Kieselguhr precoated filter and concentrated to half its volume in a vacuum evaporator. 100 g. of ground barley per litre was added and the enzyme precipitated onto this carrier at 10°C by the slow addition of 2.5 volumes of acetone. The product was filtered, washed with acetone and dried in vacuo at 40°C. The overall enzyme recovery was 77% with an activity of 15 units/mg.

EXAMPLE 2

P. emersonii (I.M.I. 116815) was grown on an agar medium as described in Example 1 and the spores were then used to inoculate a liquid culture stage in a medium of similar composition to that given in Table 2 except that the contents of ground barley, Solka floc and distillers solubles were respectively 1 percent, 2 percent and 2 percent w/v, the ammonium dihydrogen phosphate was replaced by 0.35 percent w/v potassium dihydrogen phosphate and the medium further contained 0.4 percent w/v ammonium sulphate. Subsequent treatment was as described in Example 1 except that the media used in the seed stage and the productive fermentation were of identical composition to that used for the liquid culture stage and the liquid culture and seed stages were incubated for 72 hours. The enzyme product was precipitated onto ground barley as described in Example 1 to yield a β-glucanase active enzyme preparation. The activity of this preparation was 25 units/mg and the overall enzyme recovery was 82 percent.

EXAMPLE 3

Three 5-litre scale stirred seed stages, prepared as in Example 2, were used to inoculate 180 gal. of the same medium sterilised in a 200 gal. stainless steel vessel. Agitation was at 270 r.p.m. with two 6-bladed impellors 1 foot 2 inches × 3 inches on the lower part of the shaft. Aeration was 40 c.f.m. and the temperature was 50°C.

After 72 hours, this second seed stage was used to inoculate a third seed stage comprising 1,800 gal. of the same medium sterilised in a 2,000 gal. stainless steel vessel. Agitation was at 233 r.p.m. with three 6-bladed impellors, 1 foot 8½ inches × 6 inches equally spaced along the bottom half of the shaft. Aeration was 240 c.f.m. and the temperature was 50°C.

After 48 hours, this third seed stage was used to inoculate 8000 gal. of the same medium sterilised in a 10,000 gal. stainless steel vessel. Agitation was at 120 r.p.m. with three 6-bladed impellers 4 feet 1 inch × 8.6 inches equally spaced along the lower half of the shaft. Aeration was 800 c.f.m. and the temperature was 50°C. Sterile water was added throughout to replace that lost by evaporation. The pH was controlled between 3.8 and 4.2.

After 6 days, the broth, containing 2,220 units/ml, was filtered and concentrated to about 5,000 units/ml using the techniques of Example 1. Sodium chloride, to give 18 percent w/v in the final product, was added and the potency of the enzyme concentrate adjusted so that, after a 'polishing' filtration through a filter press, a product of 4500 units/ml resulted. The overall enzyme recovery was 85 percent.

EXAMPLE 4

1. Samples of enzyme compositions were subjected to thermostability testing with the following results:

a. A sample of filtered broth prepared as in Example 1 was buffered to pH 6 and heated at 100°C. The mean percentage retention of β-glucanase activity after 10, 20 and 30 minutes was 58, 46 and 36 respectively. These are from duplicate determinations from two experiments of 4 preparations.

b. A solid enzyme composition containing 34 units/mg of enzyme and prepared by acetone precipitation from a sample of concentrated filtered broth prepared as in Example 1 onto ground barley containing 0.75 percent w/w carboxymethyl cellulose was intimately mixed with barley-based chicken feed at 0.1 percent, w/w, and this product was subjected to passage of live steam (at 10 lbs per square inch) for 10, 20 and 30 seconds in a steam jacketed laboratory apparatus. Percentage retention of β-glucanase activity was 83, 65 and 60 respectively (means of seven experiments involving five preparations).

c. Similar mixtures to those in (b) adjusted to 18 percent moisture and heated in a sealed tube for 4 minutes at 100°C maintained on average 70 percent of the original β-glucanase activity (Mean of 26 experiments using 22 preparations).

d. At pH 6.0, the percentage retention of β-glucanase activity in aqueous solutions obtained as in (a) above after heating for 10 minutes was as follows:

| | |
|---|---|
| 50°C | 100% |
| 60°C | 102% |
| 70°C | 98% |
| 80°C | 85% |
| 85°C | 83% |
| 90°C | 90% (apparently "out of line") |
| 95°C | 79% |

2. A laboratory experiment using filtered broth prepared as in Example 1 indicated that at 40°C β-glucanase activity was not highly dependent on pH in the range of 2.9 to 6.7. Effective degradation of β-glucan substrates occurred throughout this range, although pH values below 5 were found to be preferable.

EXAMPLE 5

In a pelleting trial an enzyme liquid concentrate containing 2785 units/ml was incorporated into a commercial barley-based chicken feed at the rate of 8 litres/ton of feed. The liquid was first absorbed onto ground wheat and this material, after drying, was mixed into the feed on a 200 lb. scale in a cascade system. After a process time of 8 minutes at 180°F. (82°C) the pellets that emerged contained 90 percent of the original enzyme activity. The enzyme content of the finished material ($20 \times 10^6$ units of enzyme/ton of feed) was sufficient for effective use in increasing significantly the weight gain of chickens per unit weight of food consumed and for increasing the metabolisable energy of the diet.

EXAMPLE 6

Digest 1

60 gm. barley, 0.56 gm. Protenase T36 and 0.44 gm. of Bacterial-α-amylase T3 in 300 ml. water.

Digest 2

As digest 1 but in addition 0.6 gm. β-Glucanase (4,500 units per gm.). Both digests were heated at 55°C. for 2 hours and then at 65°C. for ½ hour and then 75°C. for ½ hour. The digests were cooled to 62°C. (6 gm. of malt activity 50 D.U.) The digests were then maintained at 62°C. for 1½ hours and then filtered hot. Their relative viscosity, specific gravity and the volume of filtrate collected in two minutes per measured. The following are the results:

|  | Digest 1 | Digest 2 |
|---|---|---|
| Relative viscosity against water | 1.86 | 1.54 |
| Volume of filtrate for 2 minutes | 52 mls. | 59 mls. |
| Specific gravity | 47.5° | 51.7° |

These results show an improved filtration rate, an improved viscosity and an improved conversion of barley into solubles (increase in specific gravity). Protenase T36 is heat stable neutral protease manufactured and sold by Associated British Maltsters.

The above digests were brewed and the filtration rate and head retention of the resulting beer were measured. The following are the results:

|  | With β-Glucanase | Without β-Glucanase |
|---|---|---|
| Filtration rate | 514 seconds | 743 seconds |
| Head retention | 113 seconds | 115 seconds |

This shows that β-Glucanase does not affect head retention, an important factor in beer. There was no effect on yeast viability.

The above procedure was repeated using a mixture of malted barley 40 percent and barley 60 percent replacing the 60 gm. of barley, i.e., 24 gm. malted barley and 36 gm. of barley per 300 ml. The following results were obtained:

|  | With β-Glucanase | Without β-Glucanase |
|---|---|---|
| Filtration time | 138 seconds | 263 seconds |
| Relative viscosity | 1.36 | 1.59 |

We claim:
1. A process for the preparation of an enzyme composition having β-1,4/β-1,3 glucanase activity and characterised by retention of at least 75 percent of said activity on heating in aqueous solution at pH 6.0 at 95°C for 10 minutes, wherein a fermentation broth containing said enzyme composition is prepared by culturing an organism of the species *Penicillium emersonii* in a nutrient medium therefor, said medium containing at least one β-linked carbohydrate substrate.

2. The process of claim 1 wherein the organism employed is *Penicillium emersonii* of strain I.M.I. 116815 or a mutant thereof.

3. The process of claim 1 wherein the nutrient medium contains at least one source of a β-linked carbohydrate substrate selected from the group consisting of distillers solubles, cellulose and barley.

4. The process of claim 1 in which the nutrient medium contains a carbohydrate source consisting predominantly of β-linked carbohydrate.

5. The process of claim 1 wherein the nutrient medium contains 0.2 – 2.0 percent w/v of barley, 0.2 – 2.0 percent w/v of cellulose and 0.4 – 2.0 percent w/v of distillers solubles as β-linked carbohydrate substrates.

6. The process of claim 1 wherein the fermentation broth is subsequently filtered and the enzyme composition is precipitated onto a carrier selected from the group consisting of starch and β-linked carbohydrates by addition of a water-miscible organic solvent to the filtrate.

7. The process of claim 6 wherein said carrier is selected from the group consisting of ground barley and sodium carboxymethyl cellulose.

8. The process of claim 1 wherein the fermentation broth is subsequently filtered and the filtrate is concentrated to yield a concentrated solution of the enzyme composition.

9. The process of claim 8 wherein the concentrated solution is subsequently absorbed into an absorbent solid selected from the group consisting of ground wheat, ground barley and ground wheat or barley containing sodium carboxymethyl cellulose.

10. A β-1,4/β-1,3 glucanase-containing enzyme composition derived from an organism of species *Penicillium emersonii*, said enzyme composition being characterised by retention of at least 75 percent of said β-glucanase activity on heating in aqueous solution at pH 6.0 at 95°C for 10 minutes.

11. A method of biodegrading a β-1,4/β-1,3 glucan substrate which comprises treating said substrate with a β-1,4/β-1,3 glucanase-containing enzyme composition derived from an organism of species *Penicillium emersonii*, said enzyme composition being characterised by retention of at least 75 percent of said β-glucanase activity on heating in aqueous solution at pH 6.0 at 95°C for 10 minutes.

12. The method of claim 11 wherein said aqueous enzyme composition is derived from *Penicillium emersonii* of strain I.M.I. 116815 or a mutant thereof.

13. The method of claim 11 wherein said β-1,4/β-1,3 glucan-containing substrate is a member selected from the group consisting of animal feed components, barley malt production mashes and barley brewing mashes.

* * * * *